US005900565A

United States Patent [19]

Matsuda

[11] Patent Number: 5,900,565

[45] Date of Patent: May 4, 1999

[54] AUTO-PLAY APPARATUS USING PROCESSING TO THIN OUT TONE GENERATION CONTROL DATA

[75] Inventor: Toshinori Matsuda, Hamamatsu, Japan

[73] Assignee: Kabushiki Kaisha Kawai Gakki Seisakusho, Shizuoka-ken, Japan

[21] Appl. No.: 09/014,959

[22] Filed: Jan. 28, 1998

[30] Foreign Application Priority Data

Feb. 4, 1997 [JP] Japan .................................... 9-035494

[51] Int. Cl.[6] .............................. G09B 15/02; G10H 1/02; G10H 1/26

[52] U.S. Cl. ................................. 84/609; 84/622; 84/626; 84/633; 84/477 R

[58] Field of Search ..................... 84/609–614, 622–638, 84/477 R, 478

[56] References Cited

U.S. PATENT DOCUMENTS

| | | | |
|---|---|---|---|
| 5,220,119 | 6/1993 | Shimada | 84/609 |
| 5,728,962 | 3/1998 | Goede | 84/609 |

*Primary Examiner*—Stanley J. Witkowski
*Attorney, Agent, or Firm*—Hill & Simpson

[57] ABSTRACT

An auto-play apparatus has an edit function for thinning out various kinds of music tone control information indicating analog control amounts contained in auto-play data prestored in units of parts. A data sequence of music tone control information to be edited is received to detect if the target data and its preceding and succeeding data indicate one of an increment data sequence and decrement data sequence, and thins out the target data to reduce the data volume.

7 Claims, 13 Drawing Sheets

AUTO-PLAY APPARATUS USING PROCESSING TO THIN OUT TONE GENERATION CONTROL DATA

BACKGROUND OF THE INVENTION

The present invention relates to an auto-play apparatus and, more particularly, to an auto-play apparatus having a function for editing multi-level or continuous-amount music tone control information contained in auto-play data by thinning out this data.

Conventionally, an auto-play apparatus is known. The auto-play apparatus is arranged integrally with or independently of an electronic musical instrument such as an electronic keyboard, electronic piano, or the like. It effects an auto-play on the basis of auto-play data stored in an internal storage device such as a RAM (Random Access Memory) or the like.

In general, auto-play data for automatically playing a certain music piece is made up of 16 parts of auto-play data, Part1 to Part16, including a rhythm part, chord part, melody part, and the like, as shown in, e.g., FIG. 19.

The auto-play data Part1 to Part16 include various kinds of information such as note data containing key numbers, velocity information, and the like used for playing the individual parts, tone color data containing tone color numbers and the like, volume data containing volume values, and the like, music tone control information, and the like.

The music tone control information is normally multi-level or continuous-amount information such as after touch information, pitch bend information, modulation information, volume information, panpot information, expression pedal information, and the like.

Since such multi-level or continuous-amount information includes a very large number of data, this results in a large total volume of auto-play data.

For example, the pitch bend information is generated upon operation of a dial or wheel-like operation member so as to change the pitch of a music piece. Since the information generated by each operation is an analog value, data are generated at very short intervals.

However, the above-mentioned multi-level or continuous-amount music tone control information sometimes has nearly no influence on actual auto-play as long as it has data at certain intervals.

For this reason, in order to reduce the volume of the auto-play data, an auto-play apparatus which edits multi-level or continuous-amount music tone control information by thinning out its data (thinning-out edit function) is known.

However, since the conventional auto-play apparatus with the thinning-out edit function uses a method of thinning out data alternately one by one or a method of leaving only maximum and minimum value data, an auto-play that the user intended cannot be generated.

More specifically, when music tone control information A consisting of data a1 to a10 (FIG. 20) is present in auto-play data, and is edited by thinning out its data, the conventional auto-play apparatus thins out data alternately one by one, and leaves data a1, a3, a5, a7, and a9 of the data a1 to a10 as the music tone control information A. Alternatively, the apparatus leaves, as the music tone control information A, only data a10 corresponding to a maximum value and data a1 corresponding to a minimum value of the data a1 to a10.

As a result, when data are simply thinned out alternately one by one, the data a10 corresponding to the maximum value of the data a1 to a10 may be thinned out. When only the maximum and minimum value data are left, changes between the data a1 and a10 are ignored.

As described above, since the conventional auto-play apparatus with the thinning-out edit function may thin out the maximum or minimum value of multi-level or continuous-amount music tone control information, or ignores changes between the maximum and minimum values, an auto-play that the user intended cannot be generated.

SUMMARY OF THE INVENTION

The present invention has been made to remove the above-mentioned shortcomings, and has as its object to provide an auto-play apparatus which can effect an auto-play that the user intended with efficient thinning-out of data through simple operation.

According to the present invention, an auto-play apparatus having a function of performing thinning-out edit processing of various kinds of music tone control information which are included in auto-play data pre-stored in units of parts, to indicate analog amounts, comprises setting means for setting music tone control information to be subjected to the thinning-out edit processing as an object to be edited, data analysis means having change determination means for receiving a data sequence that forms the music tone control information to be edited, and detecting if target data and preceding or succeeding data of the target data form one of increment and decrement data sequences, and thinning-out means for thinning out the target data on the basis of a detection result of the change determination means.

DETAILED DESCRIPTION OF THE PREFERRED EMBODIMENT

The preferred embodiment of the present invention will be described hereinafter with reference to the accompanying drawings.

Figure 1:
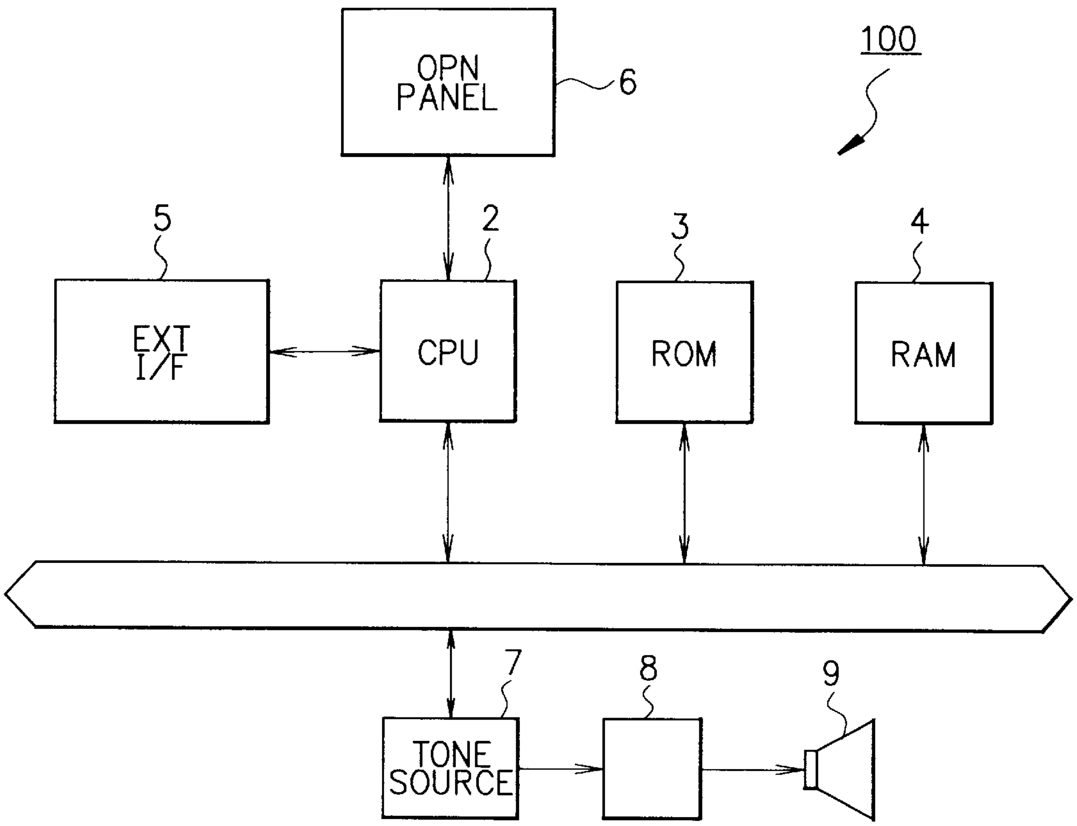
FIG. 1 is a block diagram showing the arrangement of an auto-play apparatus to which an auto-play apparatus according to the present invention is applied.

An auto-play apparatus according to the present invention is applied to, for example, an auto-play apparatus 100 shown in FIG. 1.

The auto-play apparatus 100 has a function of editing multi-level or continuous-amount music tone control information to thin out its data (thinning-out edit function). As shown in FIG. 1, the apparatus 100 comprises a CPU (Central Processing Unit) 2, a ROM (Read Only Memory) 3, a RAM (Random Access Memory) 4, and a tone source circuit 7, which are connected to-a bus line 1 including a data bus, address bus, and the like. The CPU 2, ROM 3, RAM 4, and tone source circuit 7 exchange data with each other via the bus line 1.

The CPU 2 is connected to an external interface circuit (external I/F) 5 and an operation panel 6.

Furthermore, the tone source circuit 7 is connected to an amplifier 8, which is, in turn, connected to a loudspeaker 9.

The CPU 2 controls operation of the overall apparatus in accordance with various programs stored in the ROM 3. For example, the CPU 2 scans the operation panel 6, and executes various kinds of processing to be described later in accordance with operation at the operation panel 6.

The ROM 3 stores various processing programs for the CPU 2, music tone waveform data, and the like.

The RAM 4 has an area for temporarily storing various kinds of information in the processes of execution of various kinds of processing of the CPU 2, and for storing information obtained as a result of various kinds of processing.

Figure 19:
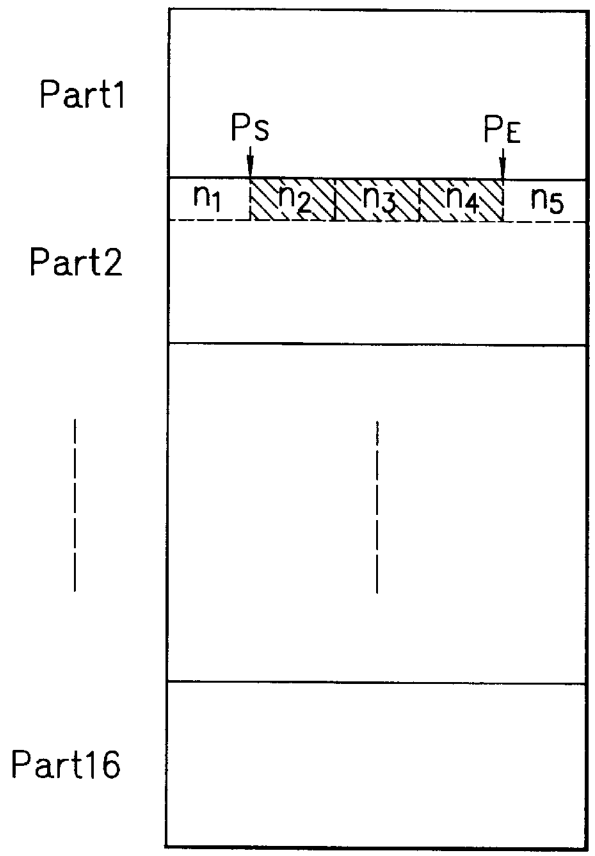
FIG. 19 is a view for explaining an example of the format of auto-play data for one music piece.
Figure 20:
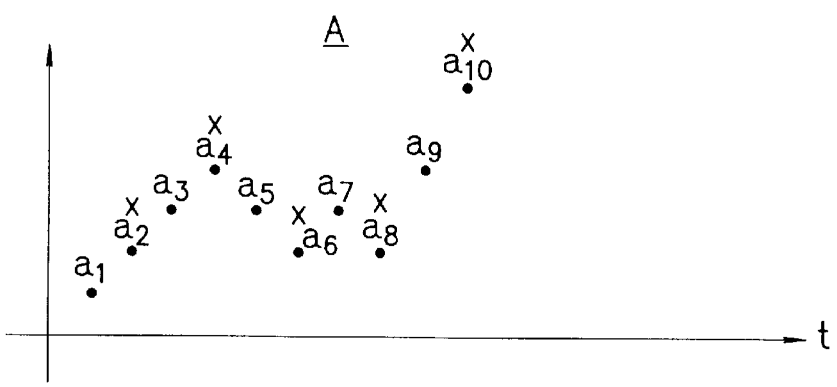
FIG. 20 is a chart for explaining a conventional thinning-out edit function.

The RAM 4 also stores auto-play data for a plurality of music pieces, as shown in FIG. 19 above.

The external I/F 5 comprises, e.g., a MIDI interfaces The external I/F 5 exchanges information between the auto-play apparatus 100 and an external equipment (not shown) in accordance with MIDI (Musical Instrument Digital Interface) standards as connection standards between the auto-play apparatus and external equipment. With this interface, the CPU 2 outputs auto-play data stored in the RAM 4 to the external equipment to control it to make an auto-play.

Figure 2:
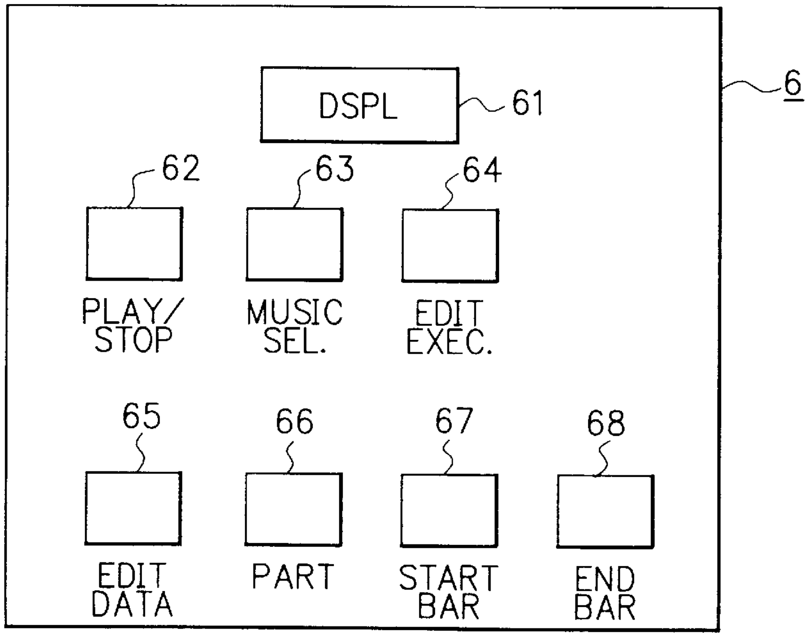
FIG. 2 is a view for explaining an operation panel of the auto-play apparatus.

The operation panel 6 has a display 61 for displaying contents set by various operation members, switches, and the like on the operation panel 6, as shown in, e.g., FIG. 2. Hence, the user can perform various operations, information setting, and the like while observing the display 61.

Also, the operation panel 6 has, as the various operation members, switches, and the like, a play/stop switch 62 used for directing the apparatus to start (play)/end (stop) an auto-play, a music selection switch 63 for selecting the music piece to be auto-played or edited, an edit execution switch 64 for directing execution of edit processing, an edit data switch 65 for selecting the data to be edited, a part switch 66 for selecting the part to be edited, and start and end bar switches 67 and 68 for selecting the bar to be edited.

The tone source circuit 7 reads out and modifies music tone waveform data stored in the ROM 3 on the basis of auto-play data supplied from the CPU 2, generates an analog music tone signal via an analog/digital converter (not shown), and supplies it to the amplifier 8.

After the music tone signal generated by the tone source circuit 7 is amplified by the amplifier 8, the amplified signal is produced as actual sound by the loudspeaker 9.

Figure 3:
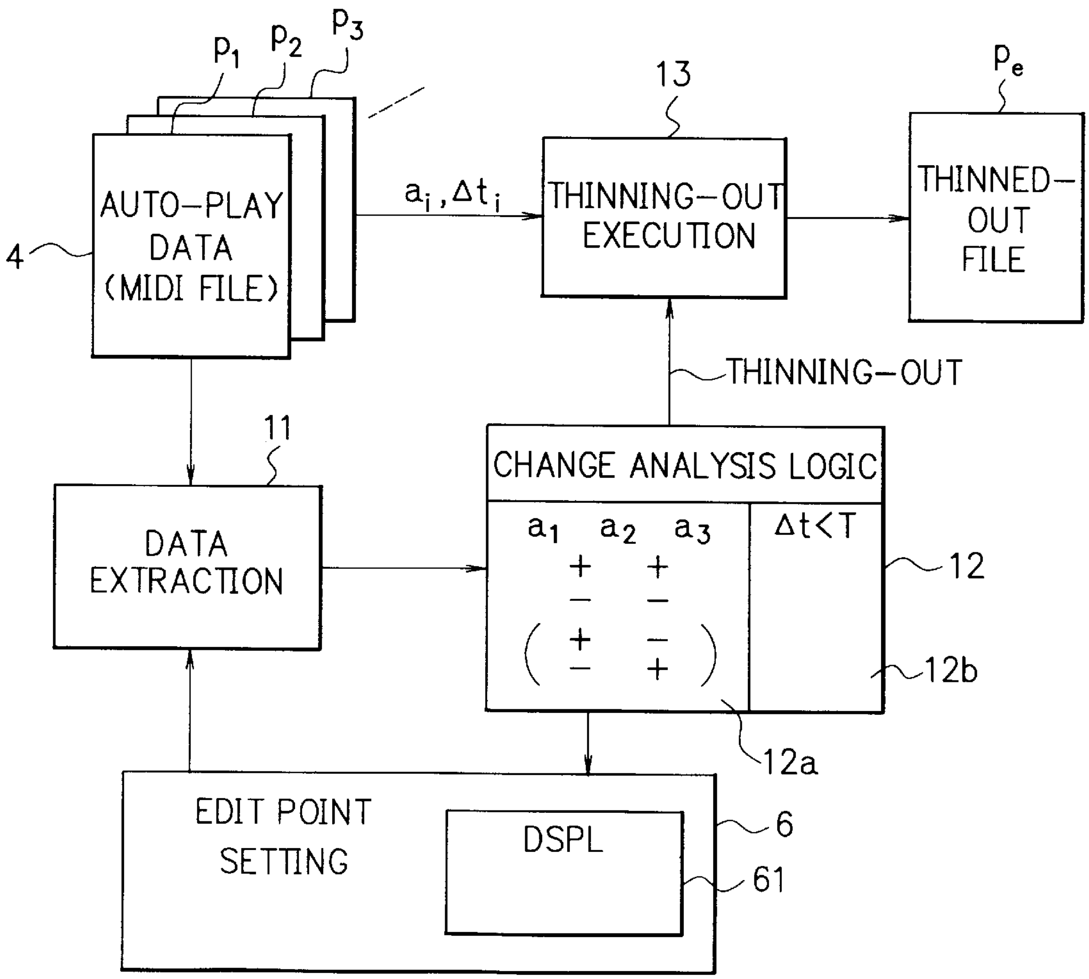
FIG. 3 is a block diagram showing principal part of the auto-play apparatus.

FIG. 3 is a block diagram showing principal part of the auto-play apparatus according to the present invention. Auto-play data as MIDI files are stored in the RAM 4 in units of music numbers P1, P2 . . . The auto-play data includes passed time information (delta time) of each event from the preceding event together with key numbers, pitch bend data, and the like generated in response to operations (events) of the keyboard and pitch wheel bender. Since music tone control information such as pitch bend information is generated on each event by, e.g., wheel operation, neighboring data in the information are not equal to each other. The operation panel 6 shown in FIG. 2 constitutes an edit point setting means, which supplies music number, part (track), and bar setting data to a data extraction unit 11. The data extraction unit 11 extracts auto-play data to be edited from the RAM 4, and supplies it to a change analysis logic 12. The analysis logic 12 detects, using a data change determination module 12*a*, on the basis of target data a2 and its preceding and succeeding data a1 and a3 from the data extraction unit 11 if these data form an increment or decrement data sequence. More specifically, the logic 12 detects an increment (+) between the data a1 and a2 and an increment (+) between the data a2 and a3, or a decrement (−) between the data a1 and a2 and a decrement (−) between the data a2 and a3. Furthermore, when the logic 12 detects, using a time determination module 12*b*, that the time interval $\Delta t$ between adjacent data is equal to or smaller than a predetermined value T, it outputs a thinning-out signal to a thinning-out execution means 13. The thinning-out execution means 13 thins out the target data a2 on the basis of the thin-out signal. The above-mentioned thinning-out processing is repeated for a sequence of data to be edited, thus forming an edited (thinned-out) data file Pe comprising the remaining data. Each remaining data does not form an increment or decrement data sequence but includes an inflection point, or forms an increment or decrement data sequence but is not redundant since the data interval from neighboring data exceeds a predetermined time duration.

Figure 4A:
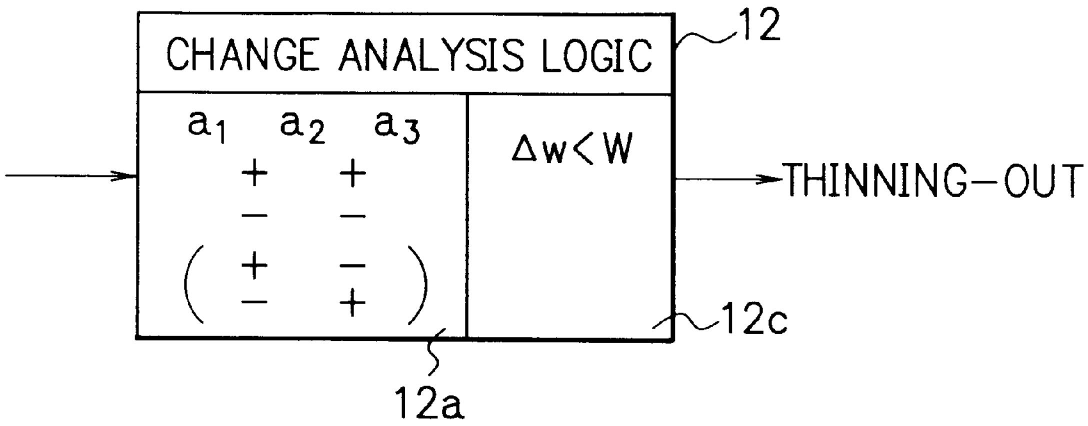
FIGS. 4A and 4B are block diagrams showing modifications of a change analysis logic shown in FIG. 3.
Figure 4B:
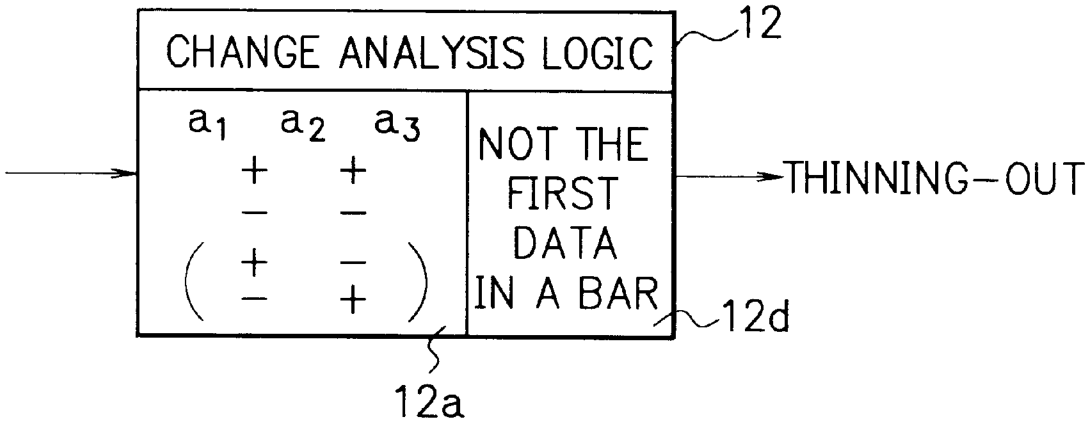

FIGS. 4A and 4B show modifications of the change analysis logic 12. In FIG. 4A, a change amount determination module 12*c* detects a case wherein the change amount $\Delta W$ between neighboring data is smaller than a predetermined value W, and determines that the target data is redundant in combination with the detection result of the data change determination module 12*a* (by calculating AND), thus outputting thinning-out information. Hence, even when data form an increment or decrement data sequence, if the change amount $\Delta W$ between neighboring data is equal to or larger than the predetermined value, the target data is left without being thinned-out. In FIG. 4B, a determination module 12*d* for determining if the target data is not the first data in a bar is arranged, and thinning-out information of the target data is output in combination with the detection result of the data change determination module 12*a* (by calculating AND). Hence, when the target data is the first data in a bar, even if it forms an increment or decrement data sequence, that data is not thinned out but left.

The operation of the auto-play apparatus 100 executed by the CPU 2 will be explained below with reference to the flow charts in FIGS. 5 to 15.

In this auto-play apparatus 100, programs according to the flow charts shown in FIGS. 5 to 15 are pre-stored in the ROM 3, and are executed by the CPU 2.

Figure 5:
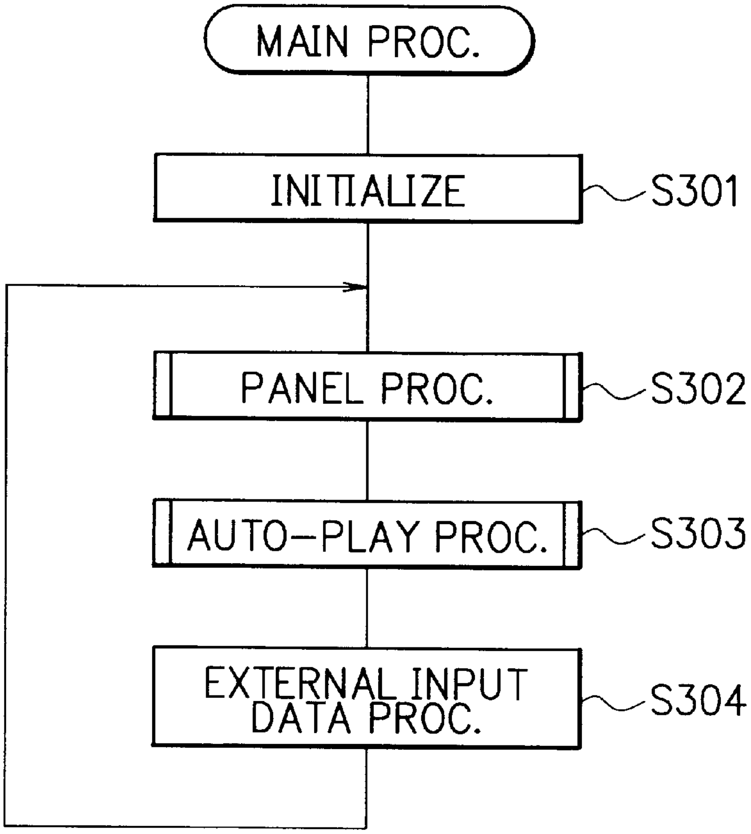
FIG. 5 is a flow chart showing main processing executed by a CPU of the auto-play apparatus.

FIG. 5 shows the main processing. When the power switch of the auto-play apparatus 100 is turned on, this main processing is executed.

More specifically, after the CPU 2 initializes the entire apparatus (step S301), it executes, in turn, panel processing (step S302), auto-play processing (step S303), and processing (step S304) for input data from the external I/F 5 or the like, and the flow then returns to the panel processing in step S302.

Figure 6:
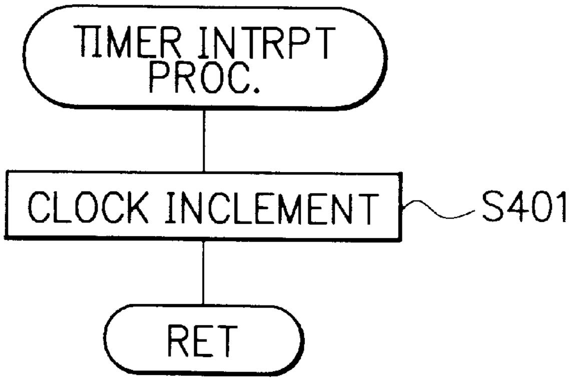
FIG. 6 is a flow chart showing timer interrupt processing executed during auto-play.

When an auto-play is done in the auto-play processing, the CPU 2 generates a timer corresponding to the tempo of a music piece to be auto-played, and executes timer interrupt processing shown in FIG. 6. With this processing, timer clocks are incremented at a rate corresponding to the tempo of the music piece to be auto-played (step S401).

Figure 7:
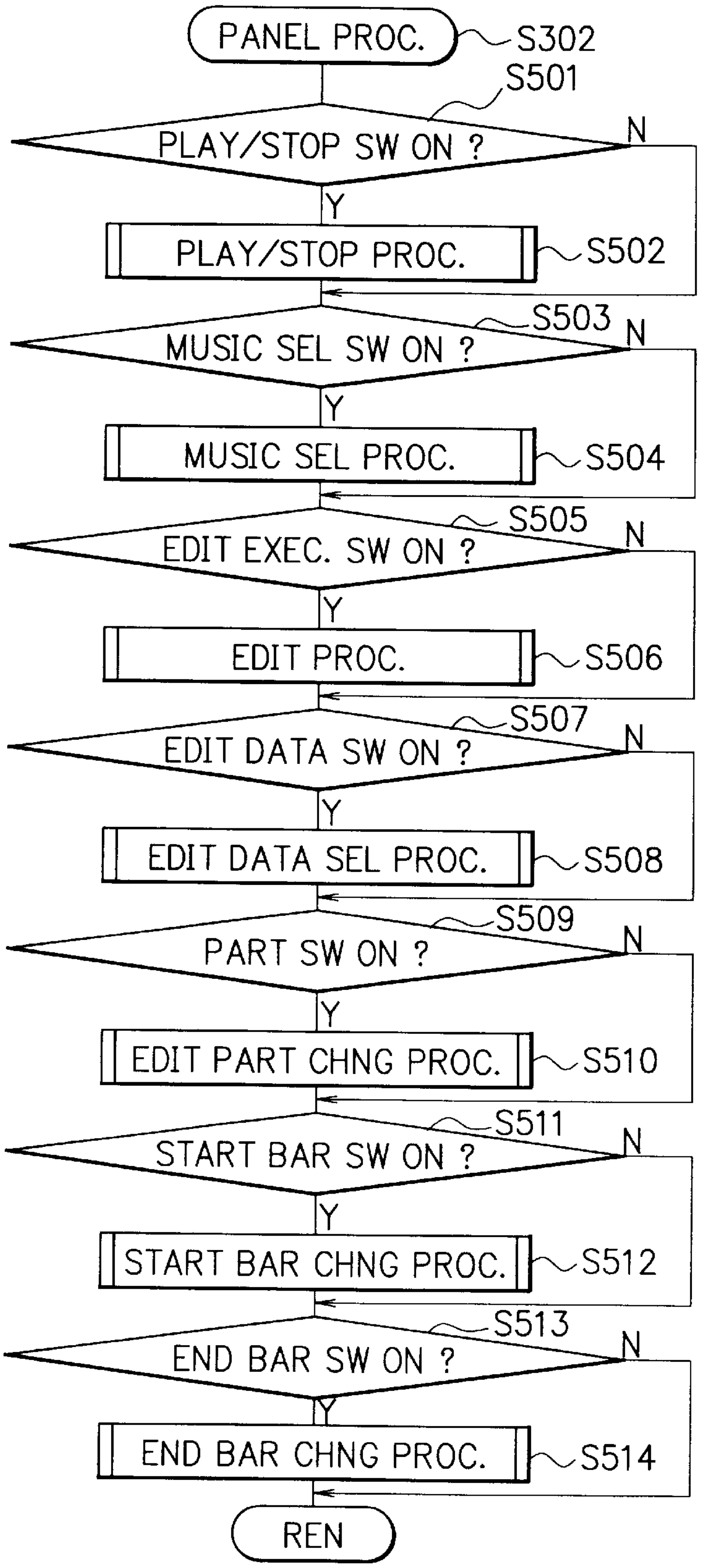
FIG. 7 is a flow chart showing panel processing in the main processing.

FIG. 7 is a flow chart showing the panel processing (step S302) in the main processing of FIG. 5 in detail.

In this panel processing, the CPU 2 checks if the play/stop switch 62 on the operation panel 6 is ON (step S501).

If it is determined in step S501 that the play/stop switch 62 is ON, the CPU 2 executes play/stop processing (step S502), and advances to the next processing in step S503.

If it is determined in step S501 that the play/stop switch 62 is OFF, or after the play/stop processing in step S502, the CPU 2 checks if the music selection switch 63 on the operation panel 6 is ON (step S503).

If it is determined in step S503 that the music selection switch 63 is ON, the CPC 2 executes music selection processing (step S504), and then advances to the next processing in step S505.

If it is determined in step S503 that the music selection switch 63 is OFF, or after the music selection processing in step S504, the CPU 2 checks if the edit execution switch 64 on the operation panel 6 is ON (step S505).

If it is determined in step S505 that the edit execution switch 64 is ON, the CPU 2 executes edit processing (step S506), and then advances to the next processing in step S507.

If it is determined in step S505 that the edit execution switch 64 is OFF, or after the edit processing in step S506, the CPU 2 checks if the edit data switch 65 on the operation panel 6 is ON (step S507).

If it is determined in step S507 that the edit data switch 65 is ON, the CPU 2 executes edit data selection processing (step S508), and then advances to the next processing in step S509.

If it is determined in step S507 that the edit data switch 65 is OFF, or after the edit data selection processing in step S508, the CPU 2 checks if the part switch 66 on the operation panel 6 is ON (step S509)

If it is determined in step S509 that the part switch 66 is ON, the CPU 2 executes edit part change processing (step S510), and advances to the next processing in step S511.

If it is determined in step S509 that the part switch 66 is OFF or after the edit part change processing in step S510, the CPU 2 checks if the start bar switch 67 on the operation panel 6 is ON (step S511).

If it is determined in step S511 that the start bar switch 67 is ON, the CPU 2 executes start bar change processing (step S512), and advances to the next processing in step S513.

If it is determined in step S511 that the start bar switch 67 is OFF, or after the start bar change processing in step S512, the CPU 2 checks if the end bar switch 68 on the operation panel 6 is ON (step S513).

If it is determined in step S513 that the start bar switch 68 is ON, the CPU 2 executes end bar change processing (step S514), and then returns to the main processing shown in FIG. 5.

If it is determined in step S513 that the start bar switch 68 is OFF, the CPU 2 directly returns to the main processing shown in FIG. 5.

As described above, in the panel processing, the switch states on the operation panel 6 are detected, and various kinds of processing are executed on the basis of the detected states.

Figure 8:
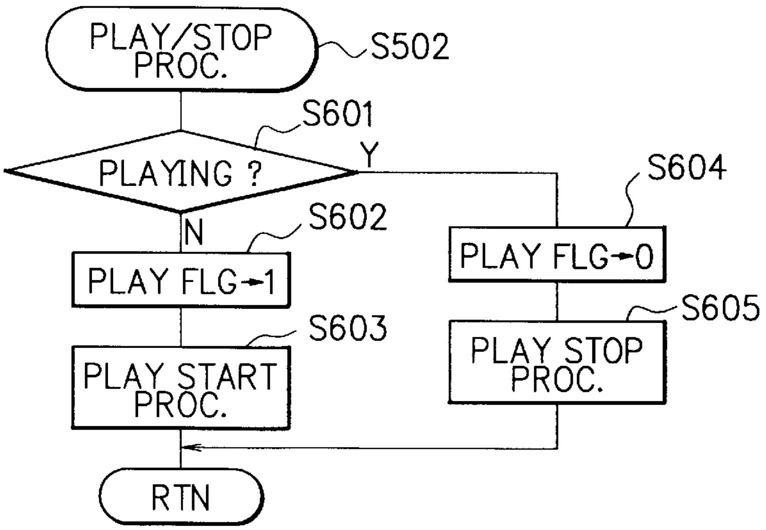
FIG. 8 is a flow chart showing play/stop processing in the panel processing.

FIG. 8 is a flow chart showing the play/stop processing (step S502) in the panel processing of FIG. 7 in detail.

The auto-play apparatus 100 has, for example, a play flag indicating whether or not the apparatus is executing an auto-play. This play flag is set at "1"when the apparatus is executing an auto-play; otherwise, it is set at "0".

In the play/stop processing, the CPU 2 checks based on the play flag if the apparatus is executing an auto-play (step S601).

If it is determined in step S60l that the apparatus is executing an auto-play, the CPU 2 clears the play flag to "0" (step S604), and executes processing for stopping the auto-play (processing for clearing music tones) (step S605).

If it is determined in step S601 that the apparatus is not executing an auto-play, the CPU 2 sets the play flag at "1" (step S602).

The CPU 2 executes processing for starting an auto-play (step S603). More specifically, the CPU 2 sets the start pointer of auto-play data corresponding to the music number obtained by the music selection processing (to be described later) in units of parts, and executes the auto-play processing (step S303) shown in FIG. 5.

After the play stop processing (step S605) or play start processing (step S603), the CPU 2 returns to the panel processing shown in FIG. 7.

Figure 9:
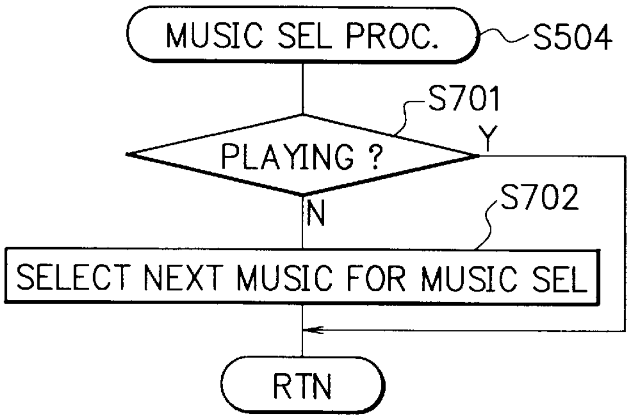
FIG. 9 is a flow chart showing music selection processing in the panel processing.

FIG. 9 is a flow chart showing the music selection processing (step S504) in the panel processing of FIG. 7 in detail.

In this auto-play apparatus 100, auto-play data for a plurality of music pieces are stored in the RAM 4, and the music piece to be auto-played or to be subjected to thinning-out can be selected from these data by pressing the music selection switch 63. Every time the music selection switch 63 is ON, the music number is incremented, and the music number at that time is displayed on the screen of the display 61. Hence, the user can select a desired music piece by operating the music selection switch 63 while confirming the music number on the screen of the display 61.

In this music selection processing, the CPU 2 checks based on the above-mentioned play flag if the apparatus is executing an auto-play (step S701).

If it is determined in step S701 that the apparatus is executing an auto-play, the CPU 2 directly returns to the panel processing shown in FIG. 7.

If it is determined in step S701 that the apparatus is not executing an auto-play, the CPU 2 updates the music number stored in its internal memory to the next music number (step S702), and then returns to the panel processing shown in FIG. 7.

Figure 10:
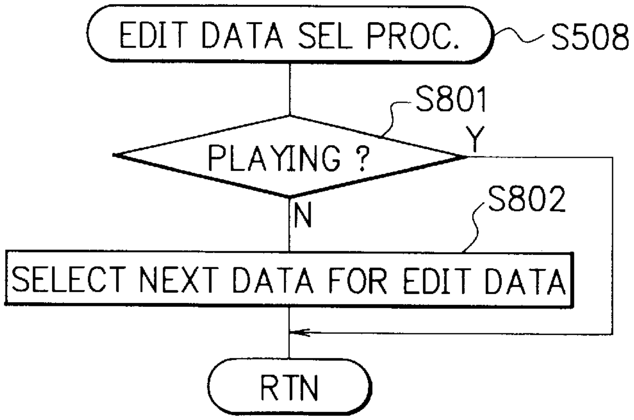
FIG. 10 is a flow chart showing edit part data selection processing in the panel processing.

FIG. 10 is a flow chart showing the edit data selection processing (step S508) in the panel processing of FIG. 7 in detail.

Data that can be thinned out by the auto-play apparatus 100 is music tone control information in the auto-play data, especially, music tone control information based on an analog value, as described above. More specifically, six kinds of information, i.e., after touch information, pitch bend information, modulation information, volume information, panpot information, and expression information can be subjected to the thinning-out edit function. The information to be thinned out can be selected from these six kinds of information by pressing the edit data switch 65. Every time the edit data switch 65 is ON, the information to be edited is switched in turn to the after touch information, pitch bend information, modulation information, volume information, panpot information, and expression information, and the current information to be edited is displayed on the screen of the display 61. Hence, the user can select desired information by operating the edit data switch 65 while confirming it on the screen of the display 61.

In this edit data selection processing, the CPU 2 checks based on the above-mentioned play flag if the apparatus is executing an auto-play (step S801).

If it is determined in step S801 that the apparatus is executing an auto-play, the CPU 2 directly returns to the panel processing shown in FIG. 7.

If it is determined in step S801 that the apparatus is not executing an auto-play, the CPU 2 updates information indicating the information to be edited and stored in its internal memory to that indicating the next information (step S802), and returns to the panel processing shown in FIG. 7.

Note that the music tone control information that can be edited is not limited to the six kinds of information, i.e., after touch information, pitch bend information, modulation information, volume information, panpot information, and expression information, and any other analog information can be edited.

Figure 11:
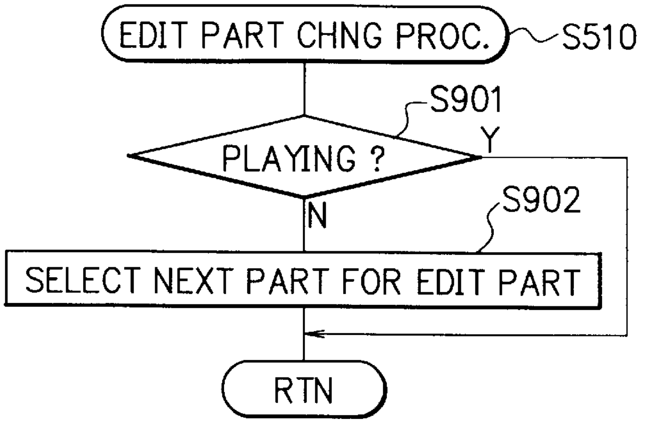
FIG. 11 is a flow chart showing edit part data selection processing in the panel processing.

FIG. 11 is a flow chart showing the edit part change processing (step S510) in the panel processing in FIG. 7 in detail.

The auto-play apparatus 100 can edit auto-play data in units of parts by thinning out data, and can select the part to be edited by pressing the part switch 66. For example, when the music number to be edited is obtained as a result of the above-mentioned music selection processing (step S504) done upon operation of the music selection switch 63, the part to be edited of the auto-play data corresponding to the music number to be edited can be designated by operating the part switch 66. More specifically, every time the part switch 66 is pressed, the part to be edited is switched in turn to part 1, part 2, . . . , and the current part to be edited is displayed on the screen of the display 61. Hence, the user can select a desired part by operating the part switch 66 while confirming it on the screen of the display 61.

In the edit part change processing, the CPU 2 checks based on the above-mentioned play flag if the apparatus is executing an auto-play (step S901).

If it is determined in step S901 that the apparatus is executing an auto-play, the CPU 2 directly returns to the panel processing shown in FIG. 7.

If it is determined in step S901 that the apparatus is not executing an auto-play, the CPU 2 updates information indicating the part to be edited stored in its internal memory to that indicating the next part (step S902), and returns to the panel processing shown in FIG. 7.

Figure 12:
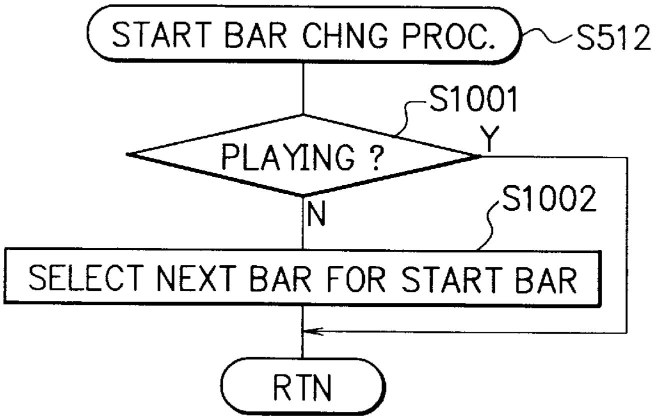
FIG. 12 is a flow chart showing start bar change processing.

FIG. 12 is a flow chart showing the start bar change processing (step S512) in the panel processing of FIG. 7 in detail.

In the auto-play apparatus 100, after the music piece to be edited, the part to be edited in that music piece, and the music tone control information to be edited in the determined part are determined as a result of the above-mentioned music selection processing (step S504), edit part change processing (step S510), and edit data selection processing (S508) which are done upon operation of the music selection switch 63, part switch 66, and edit data switch 65, the user can designate the bar from which the thinning-out edit processing is started in the auto-play state to be edited by pressing the start bar switch 67. More specifically, every time the start bar switch 67 is pressed, the bar number is switched in turn to 1, 2, . . . and the current bar number is displayed on the screen of the display 61. Hence, the user can designate the bar from which the thinning-out edit processing is to be started by operating the start bar switch 67 while confirming it on the screen of the display 61.

In this start bar change processing, the CPU 2 checks based on the above-mentioned play flag if the apparatus is executing an auto-play (step S1001).

If it is determined in step S1001 that the apparatus is executing an auto-play, the CPU 2 directly returns to the panel processing shown in FIG. 7.

If it is determined in step S1001 that the apparatus is not executing an auto-play, the CPU 2 updates information indicating the start bar number in its internal memory to the next bar number (step S1002), and returns to the panel processing shown in FIG. 7.

Figure 13:
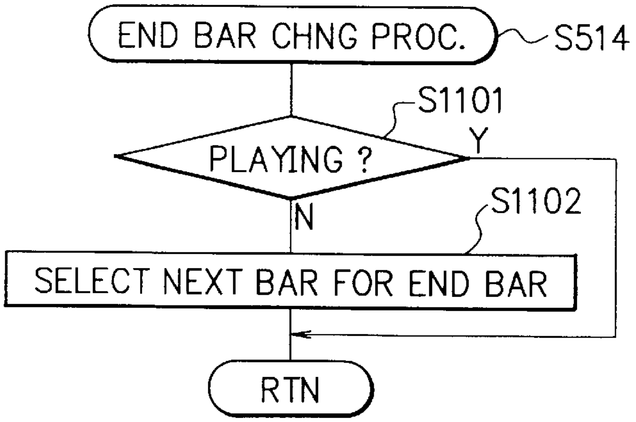
FIG. 13 is a flow chart showing end bar change processing.

FIG. 13 is a flow chart showing the end bar change processing (step S514) in the panel processing of FIG. 7 in detail.

In this auto-play apparatus 100, after the start bar of the thinning-out edit processing is determined by the start bar switch 67, the user can designate the end bar of the thinning-out edit processing by pressing the end bar switch 68. Every time the end bar switch 68 is pressed, the bar number is switched in turn to 1, 2, . . . , and the current bar number is displayed on the screen of the display 61. Hence, the user can designate the end bar of the thinning-out edit processing by operating the end bar switch 68 while confirming it on the screen of the display 61. With this processing, as shown in, e.g., FIG. 19, the user can designate execution of the thinning-out edit processing for only music tone control information present in second to fourth bars n2 to n4 in auto-play data Part2 as part 2 of a certain music piece.

In this end bar change processing, the CPU 2 checks based on the above-mentioned play flag if the apparatus is executing an auto-play (step S1101).

If it is determined in step S1101 that the apparatus is executing an auto-play, the CPU 2 directly returns to the panel processing shown in FIG. 7.

If it is determined in step S1101 that the apparatus is not executing an auto-play, the CPU 2 updates information indicating the end bar number stored in its internal memory to the next bar number (step S1102), and returns to the panel processing shown in FIG. 7.

Note that the above-mentioned start bar change processing (step S512) and end bar change processing (S514) are programmed to inhibit the "start bar number" from becoming larger than the "end bar number" For example, these processing programs are designed so that "start bar number≦end bar number" always holds, and when an identical value is set in the start and end bar numbers, only the bar of that value is subjected to the thinning-out edit processing.

Figure 14:
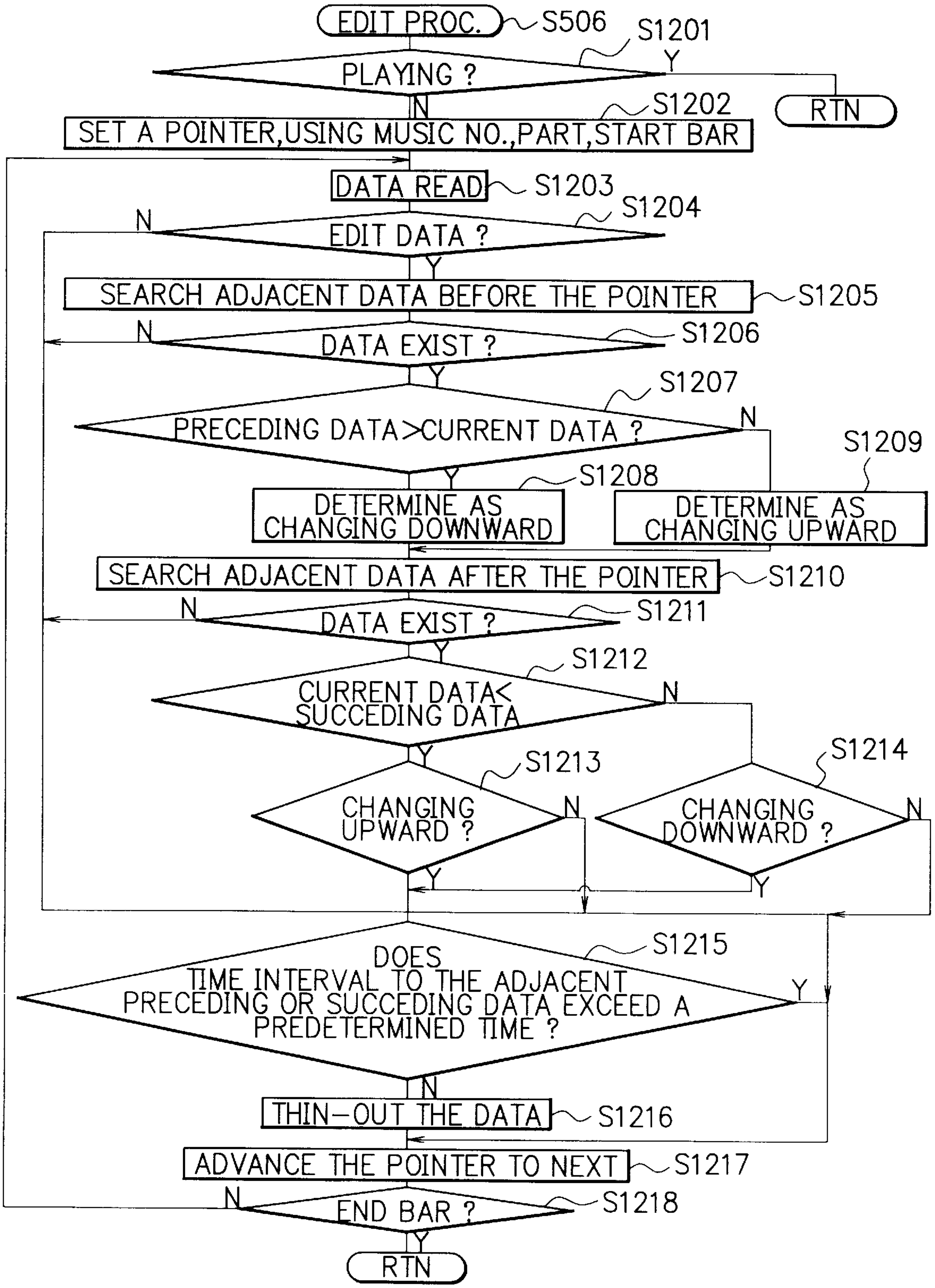
FIG. 14 is a flow chart showing edit processing in the panel processing.

FIG. 14 is a flow chart showing the edit processing (step S506) in the panel processing shown in FIG. 7 in detail.

In this auto-play apparatus 100, after the above-mentioned music selection processing (step S504), edit part change processing (step S510), edit data change processing (step S508), start bar change processing (step S512), and end bar change processing (step S514) are executed in turn upon operation of the music selection switch 63, part switch 66, edit data switch 65, start bar switch 67, and end bar switch 68, when the edit execution switch 64 is pressed, the edit processing is executed.

Therefore, at this time, the music number, part, and type of music tone control information to be edited, and the start and end bar numbers of the thinning-out edit processing are already stored in the internal memory of the CPU 2.

Figure 16:
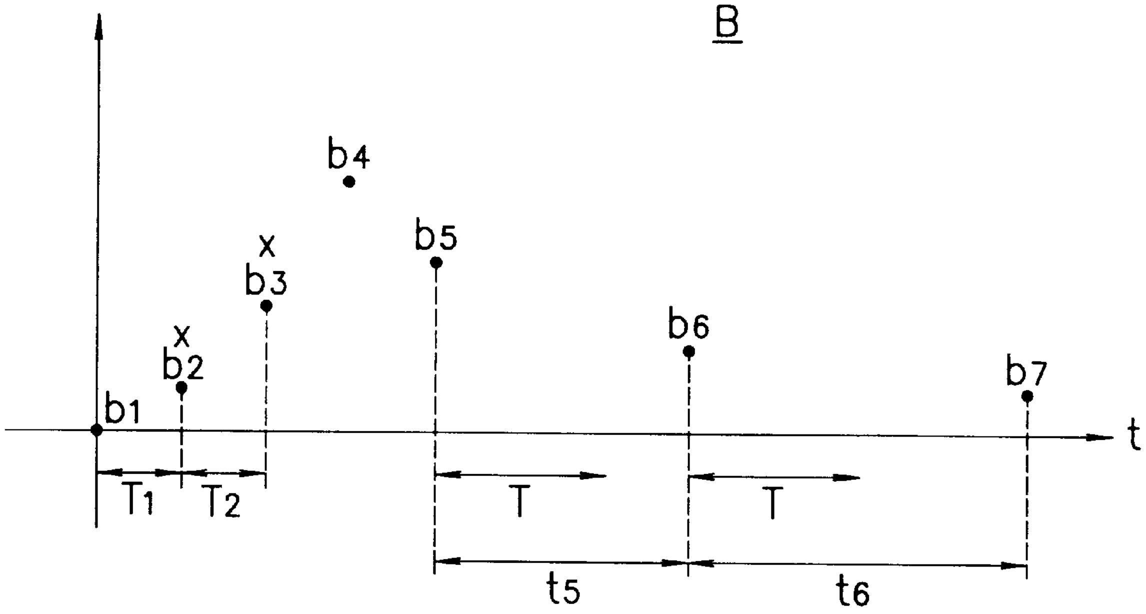
FIG. 16 is a chart for explaining music tone control information present in auto-play data.

For the sake of simplicity, assume that the user designates the second to fourth bars n2 to n4 in the auto-play data Part2 of part 2 of a certain music piece as those to be subjected to the thinning-out edit processing, as shown in FIG. 19, and music tone control information B as the information to be edited shown in FIG. 16 is present in the second to fourth bars n2 to n4. The music tone control information B consists of data b1 to b7, which are to be subjected to the thinning-out edit processing.

The CPU 2 checks based on the above-mentioned play flag if the apparatus is executing an auto-play (step S1201).

If it is determined in step S1201 that the apparatus is executing an auto-play, the CPU 2 directly returns to the processing shown in FIG. 7.

If it is determined in step S1201 that the apparatus is not executing an auto-play, the CPU 2 sets a start pointer PS of the second bar n2 in the auto-play data Part2 of part 2 as a read start position (read pointer) using various kinds of information stored in the internal memory, as described above (step S1202).

The CPU 2 then reads out data from the read pointer set in step S1202 (step S1203).

The CPU 2 checks if the data read out in step S1203 is music tone control information designated by the edit data switch 65, i.e., the music tone control information B (edit data b1) shown in FIG. 16 (step S1204).

If it is determined in step S1204 that the readout data is not the edit data b1, the CPU 2 advances to the processing in step S1217 to be described later.

If it is determined in step S1204 that the readout data is the edit data b1, the CPU 2 searches for edit data adjacent to the edit data b1 before the pointer (step S1205).

In this case, since the edit data b1 is the first data, it is determined in step S1205 that "edit data is absent", and the CPU 2 advances to the processing in step S1217.

In step S1217, the CPU 2 updates the read pointer to read out the next data.

The CPU 2 then checks if the read pointer updated in step S1217 has reached an end pointer PE in the fourth bar n4 as the end bar (step S1218).

If it is determined in step S1218 that the read pointer has reached the end pointer PE, the CPU 2 returns to the panel processing shown in FIG. 7. However, since the processing for the second bar n2 is still underway in this case, the CPU 2 returns to the processing in step S1203.

The next data is read out by the processing in step S1203, as described above, and it is then checked in step S1204 if the readout data is edit data b2.

If it is determined in step S1204 that the readout data is not the edit data b2, the CPU 2 advances to the processing in step S1217.

If it is determined in step S1204 that the readout data is the edit data b2, the CPU 2 searches for edit data adjacent to the edit data by before the pointer (step S1205).

The edit data b1 before the current edit data b2 is detected in step S1205, and it is determined in step S1206 that "edit data exists".

If it is determined in step S1206 that "edit data exists", the CPU 2 checks if the preceding data (edit data b1) is larger than the current data (edit data b2) (step S1207).

If it is determined in step S1207 that "preceding data>current data", the CPU 2 stores that "data is changing downward" (step S1208). In contrast, if it is determined in step S1207 that "preceding data>current data" does not hold, the CPU 2 stores that "data is changing upward" (step S1209).

Since "edit data b1<edit data b2" in this case, the CPU 2 stores that "data is changing upward".

After the processing in step S1208 or S1209, the CPU 2 searches for edit data adjacent to the edit data b2 after the pointer (step S1210).

In this case, since edit data b3 is present after the edit data b2, this edit data b3 is detected in step S1210, and as a result, it is determined in step S1211 that "edit data exists". The CPU 2 then advances to the processing in step S1212.

On the other hand, if it is determined in step S1211 that "edit data is absent", the CPU 2 advances to the processing in step S1217.

The CPU 2 checks in step S1212 if the current data (edit data b2) is larger than the succeeding data (edit data b3).

If it is determined in step S1212 that "current data<succeeding data", the CPU 2 checks using the stored determination result in step S1207 if all the three edit data b1, b2, and b3 are changing upward (step S1213).

If it is determined in step S1213 that all the three data are "changing upward", the CPU 2 advances to the next step S1215; otherwise, the CPU 2 advances to step S1217.

On the other hand, if it is determined in step S1212 that "current data<succeeding data" does not hold, the CPU 2 checks using the stored determination result in step S1207 if all the three edit data b1, b2, and b3 are changing downward (step S1214).

If it is determined in step S1214 that all the three data are "changing downward", the CPU 2 advances to the next step S1215; otherwise, the CPU 2 advances to step S1217.

In this case, since edit data b1 (preceding data)<edit data b2 (current data)<edit data b3 (succeeding data), it is determined in step S1212 that "current data<succeeding data", and the flow advances to step S1213. It is then determined in step S1213 that the data are "changing upward", and the flow advances to step S1215.

The CPU 2 checks in step S1215 if a time interval between the current data and its adjacent preceding or succeeding data has exceeded a predetermined time T.

If it is determined in step S1215 that the time interval has exceeded the predetermined time T, the CPU 2 thins out the current data (step S1216), and advances to step S1217.

Note that the thinned-out data is stored in, e.g., the internal memory of the CPU 2 for the next processing.

On the other hand, if it is determined in step S1215 that the time interval does not exceed the predetermined time T, the CPU 2 skips the processing in step S1216 to leave the current data, and advances to step S1217.

In this case, for example, a time t1 passed from the edit data b1 (preceding data) to the edit data b2 (current data) is set to satisfy "t1<T", and a time t2 passed from the edit data b2 (current data) to the edit data b3(succeeding data) is set to satisfy "t2<T". So, the edit data b2 (current data) is thinned out in step S1216, and is stored in the internal memory of the CPU 2 for the next processing.

As described above, as a result of comparison of the edit data b1, b2, and b3, since all the data are changing upward, the edit data b2 is thinned out. Likewise, in the processing for the next edit data b3, as a result of comparison of the edit data b2, b3, and b4, since all the data are changing upward, the edit data b3 is thinned out.

In the processing for the next edit data b4, the edit data b3, b4, and b5 are compared.

In this processing, since edit data b3 (preceding data)<edit data b4 (current data)>edit data b5 (succeeding data), it is determined in step S1207 that the data are "changing upward", and it is determined in steps S1212 and S1213 that the data are "not changing upward". That is, it is determined that none of the three edit data b3, b4, and b5 are changing upward. Hence, in this case, the edit data b4 is not thinned out.

In this way, when the edit data corresponds to an inflection point, that edit data is not thinned out.

The processing is sequentially done, and in the processing for the edit data b5, the edit data b4, b5, and b6 are compared.

In this case, for example, if a time t5 passed from the edit data b5 (current data) to the edit data b6 (succeeding data) is set to satisfy "t5>T", since all the edit data b4, b5, and b6 are changing downward, but the time interval between the edit data b5 (current data) and edit data b6 (succeeding data) has exceeded the predetermined time T, it is determined in step S1215 that "the time interval has exceeded the predetermined time T". Hence, in this case, the edit data b5 is not thinned out.

In the processing for the next edit data b6 as well, if a time t6 passed from the edit data b6 (current data) to the edit data b7 (succeeding data) is set to satisfy "t6>T", since all the edit data b5, b6, and b7 are changing downward, but the time interval between the edit data b6 (current data) and edit data b7 (succeeding data) has preceeded the predetermined time T, it is determined in step S1215 that "the time interval has exceeded the predetermined time T". In this case, the edit data b6 is not thinned out.

In this manner, even when all the edit data are changing upward or downward, if the time interval between the edit data as the current data and its adjacent preceding or succeeding edit data has exceeded the predetermined time T, the edit data as the current data is inhibited from being thinned out.

Of the edit data b1 to b7, the edit data thinned out by the above-mentioned edit processing are the edit data b2 and b3 which do not correspond to any inflection point, and have time intervals smaller than the predetermined time T from adjacent preceding or succeeding edit data.

Figure 15:
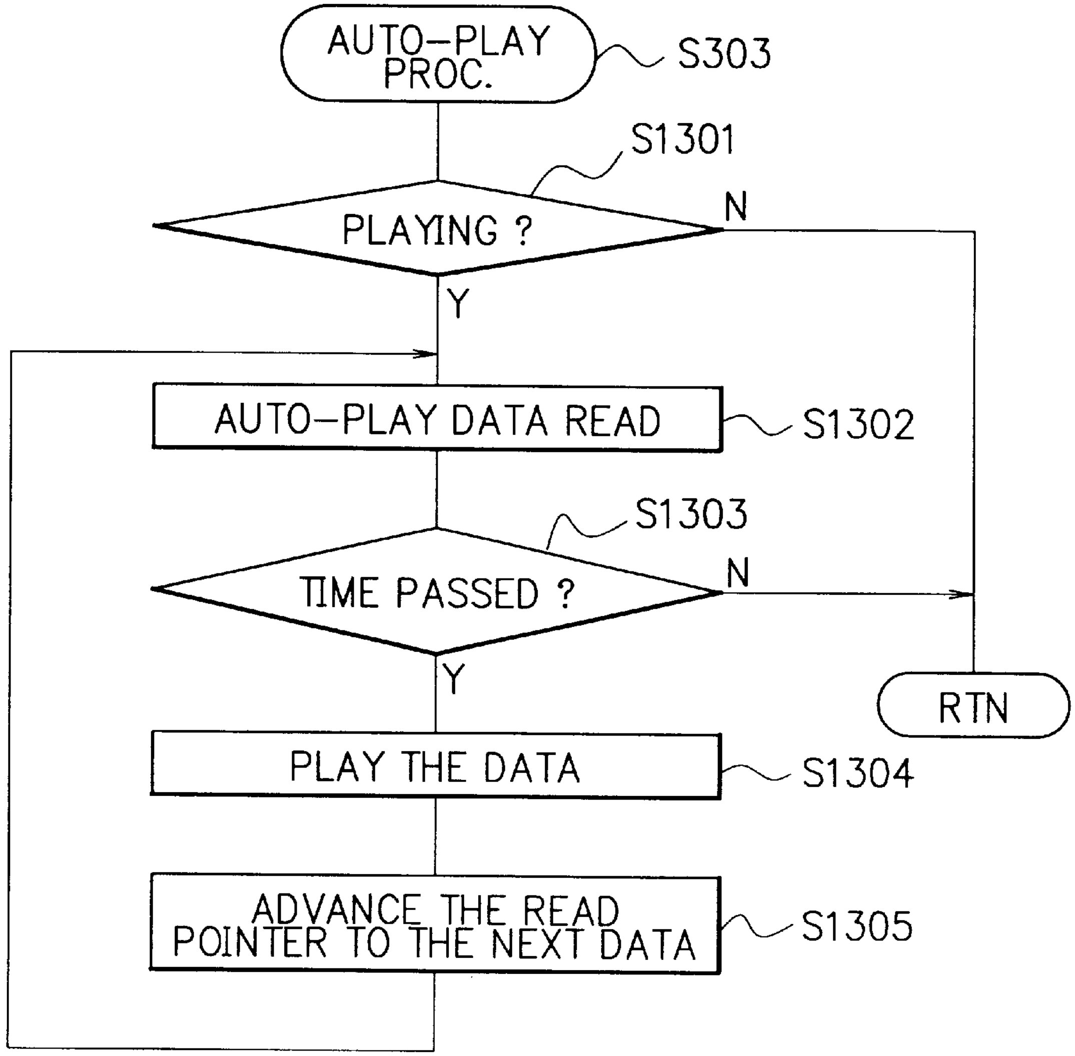
FIG. 15 is a flow chart showing auto-play processing in the main processing.

FIG. 15 is a flow chart showing the auto-play processing (step S303) in the main processing of FIG. 5 in detail.

Note that this auto-play processing is done in units of parts, and only the auto-play processing for auto-play data of a certain part will be explained for the sake of simplicity.

In this auto-play apparatus 100, when the music piece to be auto-played is selected by the music selection switch 63 while no auto-play is executed, and the play/stop switch 62 is then pressed, the above-mentioned music selection processing (step S504) and play/stop processing (step S502) are executed, and after that, this auto-play processing is executed. At this time, the timer interrupt processing shown in FIG. 6 is also executed.

At this time, the above-mentioned play flag is set at "1", and the start pointer (read pointer) of auto-play data corresponding to the music number to be auto-played is set in units of parts. Also, the timer clocks are incremented at a rate corresponding to the tempo of the music piece to be auto-played.

More specifically, the CPU 2 checks based on the play flag if the apparatus is executing an auto-play (step S1301).

If it is determined in step S1301 that the apparatus is executing an auto-play, the CPU 2 directly returns to the main processing shown in FIG. 5.

If it is determined in step S1301 that the apparatus is not executing an auto-play, the CPU 2 reads out auto-play data from the read pointer set as described above (step S1302).

Subsequently, the CPU 2 checks if time information included in the data read out in step S1302 matches the timer clocks generated by the timer interrupt processing shown in FIG. 6 (step S1303).

Note that the time information includes a play start time, and the like, and is possessed by each data in the auto-play data. Accordingly, by comparing the time information of the readout data with the timer clocks generated by the timer interrupt processing, if the readout data has reached the play timing can be determined.

If it is determined in step S1303 that the time information included in the data read out in step S1303 matches the timer clocks, the CPU 2 plays that data (step S1304). With this processing, a music tone based on that data is produced as actual sound from the loudspeaker 9.

The CPU 2 updates the pointer to indicate the read position of the next data (step S1305), and returns to the processing in step S1302.

If it is determined in step S1303 that the time information in the readout data does not match the time clocks, the CPU 2 directly returns to the main processing shown in FIG. 5.

As described above, in the auto-play apparatus 100, upon executing the thinning-out edit processing, it is checked without any complicated operations if continuous-amount data are changing upward or downward. When the data to be thinned out corresponds to an inflection point, that data is inhibited from being thinned out. In this fashion, the maximum or minimum value can be prevented from being thinned out, and the change state between the maximum and minimum values can be prevented from being ignored. Therefore, the thinning-out edit processing can be efficiently done by simple operation, and an auto-play that the user intended can be made.

Also, the time of each data is checked to determine if the time interval between the current data and its adjacent preceding or succeeding data has exceeded the predetermined time so that data is thinned out from only a portion where data are concentrated. In this way, an agreeable auto-play can be made without disturbing any smoothness of a whole play.

In the above-mentioned auto-play apparatus 100, it is checked if the time interval between the current data and its adjacent preceding or succeeding data has exceeded the predetermined time T. If the predetermined time T has passed, that edit data is inhibited from being thinned out, as shown in FIG. 16. Alternatively, a predetermined change amount of data may be set, and if the change amount between the two data has exceeded the predetermined amount, the current data may be inhibited from being thinned out.

Figure 17:
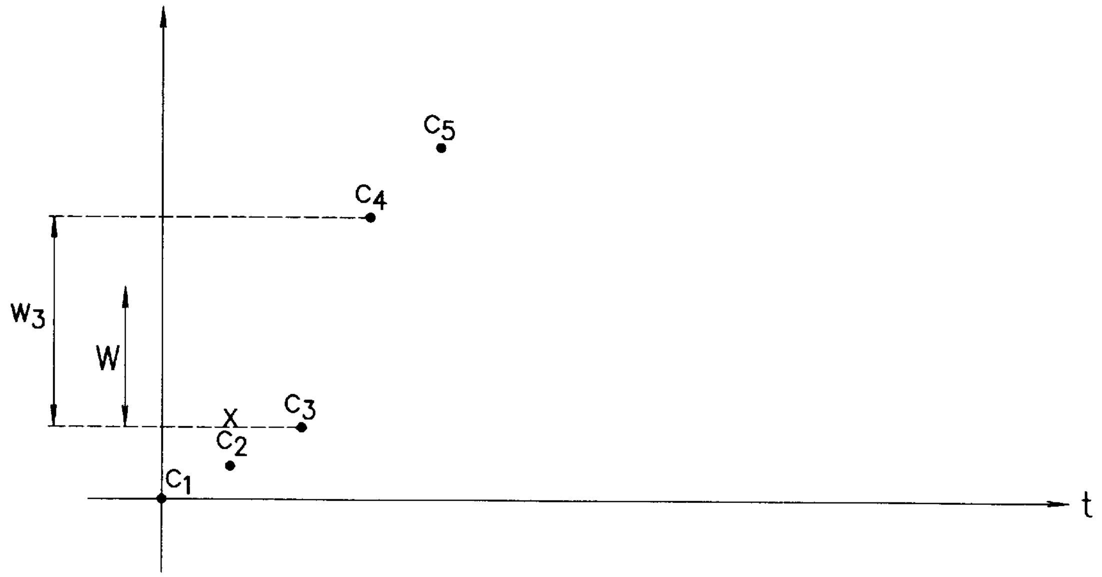
FIG. 17 is a chart for explaining a case wherein data is inhibited from being thinned out when the change amount of data is equal to or larger than a predetermined amount.

For example, as shown in FIG. 17, if a difference w3 between edit data c4 (current data) and edit data c3 (preceding data) has exceeded a predetermined amount W, even if all edit data c3, c4, and c5 are changing upward, the edit data c4 is inhibited from being thinned out.

Also, when the processing for the next bar is started, the first data in that bar may be inhibited from being thinned out.

Figure 18:
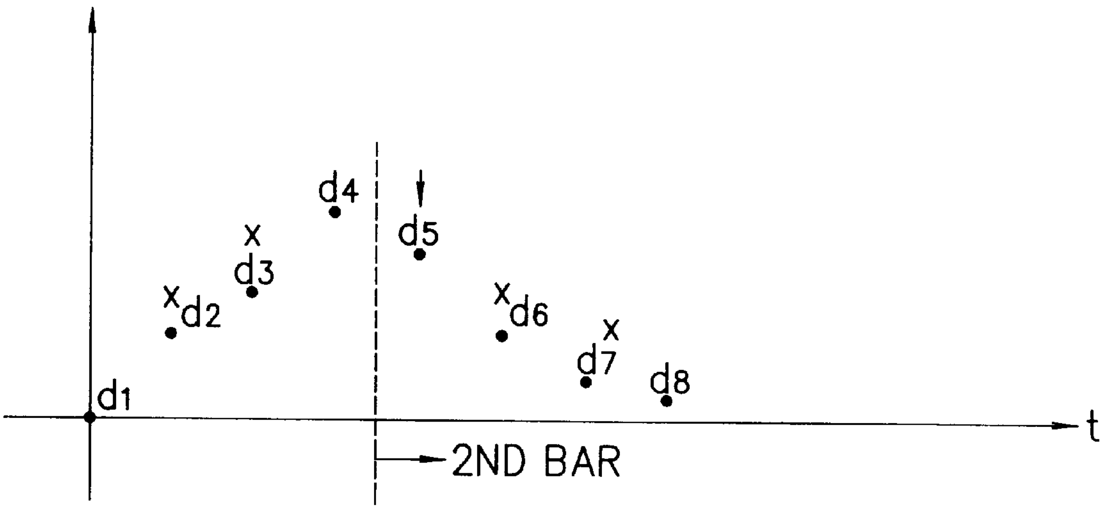
FIG. 18 is a chart for explaining a case wherein data in the next bar is inhibited from being thinned out.

For example, as shown in FIG. 18, if edit data d1 to d4 exist in the first bar and edit data d5 to d8 exist in the second bar, since all the edit data d4, d5, and d6 are changing downward, the edit data d5 should be thinned out. However, since the edit data d5 is the first data of the second bar, it is inhibited from being thinned out.

In this manner, the user can easily recognize music tone control information to be thinned out so as to efficiently reduce the data volume.

Furthermore, the types of music tone control information present in the auto-play data to be edited may be detected, and the number of data that form each type of music tone control information may be detected. Using the detection results, the music tone data to be edited may be determined so as to efficiently reduce the data volume. In this case, when the determination result is displayed on the display 61, the user can recognize the music tone control information to be edited at a glance. The determination means in this case is built by the change analysis logic 12 shown in FIG. 3, and when it determines the presence of a predetermined number or more of data, the means supplies a music number and part number that select the music tone control information to the edit point setting means (operation panel 6).

As described above, when the thinning-out edit processing is done for the designated analog music tone control information (multi-level or continuous-amount music tone control information), it is checked without any complicated operation if the target data of those which form the music tone control information, and its preceding or succeeding data form an increment or decrement data sequence, and the target data is thinned out based on the checking result. When the target data corresponds to an inflection point, the target data is inhibited from being thinned out. For this reason, the maximum or minimum value can be prevented from being thinned out, and the change state between the maximum and minimum values can be prevented from being entirely ignored. The thinning-out edit processing can be efficiently done by simple operation, and an auto-play that the user intended can be made.

It is also checked if the time interval between the target data and its preceding or succeeding data has exceeded the predetermined time, and the target data is thinned out on the basis of the checking result. When the time interval between the target data and its preceding or succeeding data has exceeded the predetermined time, that target data can be inhibited from being from being thinned out. Hence, since the thinning-out edit processing can be done only for the duration where data are concentrated, an agreeable auto-play can be made without disturbing any smoothness and image of a whole play.

It is checked if the change amount between the target data and its preceding or succeeding data has exceeded the predetermined amount, and the target data is thinned out on the basis of the checking result. When the change amount between the target data and its preceding or succeeding data has exceeded the predetermined amount, that target data can be inhibited from being thinned out. Henceforth, since the thinning-out edit processing can be done for only values within the range wherein data are concentrated, an agreeable auto-play can be made without disturbing any smoothness and image of a whole play.

It is checked if the target data is the first data in a given bar, and the target data is thinned out on the basis of the checking result. When the target data is the first data in the bar, that target data can be inhibited from being from being thinned out. Hence, since the thinning-out edit processing can be done for only values within the range wherein data are concentrated, an agreeable auto-play can be made without disturbing any smoothness and image of a whole play.

The types of music tone control information included in auto-play data, and the number of data which form each type of music tone control information are detected, and the detection results are displayed on the screen. In this way as the user can easily recognize the music tone control data to be thinned out so as to efficiently reduce the data volume, the thinning-out edit processing can be done more efficiently.

The types of music tone control information included in auto-play data, and the number of data which form each type of music tone control information are detected, the music tone control information to be thinned out is determined on the basis of the detection results, and the determination result is displayed on the screen. With this processing, the user can recognize the music tone control data to be thinned out at a glance so as to efficiently reduce the data volume. Consequently, the thinning-out edit processing can be done more efficiently.

Since the after touch information, pitch bend information, modulation information, volume information, panpot information, and expression information can be subjected to the thinning-out edit processing, the data volumes of such information can be reduced.

What is claimed is:

1. An auto-play apparatus for performing thinning-out edit processing of various kinds of music tone control parameters which are included in auto-play data which are pre-stored in units of parts, to indicate analog quantities generated in response to various operations of a controller attached to a musical instrument during a performance, for modifying at least one of an amplitude component and a frequency component of a tone wave corresponding to musical note data, comprising:

setting means for setting music tone control parameters to be subjected to the thinning-out edit processing as an object to be edited;

data analysis means having change determination means for receiving a data sequence that forms the music tone control parameters to be edited, and detecting if target data and preceding or succeeding data of the target data form an increment or a decrement data sequence; and thinning-out means for thinning out the target data on the basis of a detection result of said change determination means.

2. An apparatus according to claim 1, wherein said data analysis means comprises time determination means for determining if both time intervals between the target data and the preceding and succeeding data of the target data are not more than a predetermined value, and said thinning-out means thins out the target data on the basis of determination results of said change determination means and time determination means.

3. An apparatus according to claim 1, wherein said data analysis means comprises change amount determination means for determining if both change amounts between the target data and the preceding and succeeding data of the target data are not more than a predetermined value, and said thinning-out means thins out the target data on the basis of determination results of said change determination means and change amount determination means.

4. An apparatus according to claim 1, wherein said data analysis means comprises position determination means for determining if the target data is data other than data which is located at a first position of a bar, and said thinning-out means thins out the target data on the basis of determination results of said change determination means and position determination means.

5. An apparatus according to claim 1, wherein said data analysis means comprises detection means for detecting the number of data in units of types of music tone control parameters, and said apparatus further comprises display means for displaying a detection result of said detection means on a screen.

6. An apparatus according to claim 1, wherein said data analysis means comprises:

detection means for detecting the number of data in units of types of music tone control parameters; and edit target determination means for determining the music tone control parameters to be edited on the basis of a detection result of said detection means, and said apparatus further comprises display means for displaying a determination result of said edit target determination means on a screen.

7. An apparatus according to claim 1, wherein the various types of music tone control parameters include at least one of after touch information, pitch bend information, modulation information, volume information, panpot information, and expression pedal information of an electronic musical instrument.

* * * * *

UNITED STATES PATENT AND TRADEMARK OFFICE

CERTIFICATE OF CORRECTION

PATENT NO. : 5,900,565

DATED : May 4, 1999

INVENTOR(S) : Toshinori Matsuda

It is certified that error appears in the above-identified patent and that said Letters Patent is hereby corrected as shown below:

Column 3, lines 29 and 32, delete "1" as there is no reference numeral "1" in FIG. 1 of the drawings Column 3, line 51, change "interfaces" to --interface--

Column 9, line 38, change "the processing" to --the panel processing--

Column 10, line 12, change "by" to --b1--.

Column 14, line 23, insert a comma after "way"

Signed and Sealed this

Sixth Day of June, 2000

Attest:

Q. TODD DICKINSON

Attesting Officer

*Director of Patents and Trademarks*